(12) United States Patent
Enenkel

(10) Patent No.: US 9,038,828 B2
(45) Date of Patent: May 26, 2015

(54) DEVICE AND METHOD FOR LOADING A TRANSPORTING UNIT

(75) Inventor: Peter Enenkel, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/235,991

(22) PCT Filed: Jul. 27, 2012

(86) PCT No.: PCT/EP2012/064761
§ 371 (c)(1),
(2), (4) Date: Jan. 29, 2014

(87) PCT Pub. No.: WO2013/017538
PCT Pub. Date: Feb. 7, 2013

(65) Prior Publication Data
US 2014/0166553 A1 Jun. 19, 2014

(30) Foreign Application Priority Data

Jul. 29, 2011 (DE) .......................... 10 2011 080 096

(51) Int. Cl.
*B07C 1/00* (2006.01)
*B65G 65/00* (2006.01)
*B65G 67/08* (2006.01)
*B07C 5/00* (2006.01)

(52) U.S. Cl.
CPC ................ *B65G 65/00* (2013.01); *B65G 67/08* (2013.01); *B07C 5/00* (2013.01)

(58) Field of Classification Search
USPC ........................... 209/596, 629, 630, 645, 651
See application file for complete search history.

(56) References Cited

U.S. PATENT DOCUMENTS

| | | | |
|---|---|---|---|
| 3,836,021 A * | 9/1974 | McWilliams | 414/398 |
| 3,885,682 A * | 5/1975 | McWilliams | 414/789.8 |
| 5,718,325 A * | 2/1998 | Doster et al. | 198/592 |
| 6,006,893 A * | 12/1999 | Gilmore et al. | 198/588 |
| 6,823,985 B2 * | 11/2004 | Gilmore et al. | 198/588 |
| 7,370,753 B2 * | 5/2008 | Yang et al. | 198/812 |
| 2003/0196873 A1 * | 10/2003 | Kelly et al. | 198/618 |

FOREIGN PATENT DOCUMENTS

| | | |
|---|---|---|
| AT | 504128 A4 | 3/2008 |
| DE | 800839 | 12/1950 |
| DE | 4242703 A1 | 6/1994 |
| DE | 4338801 A1 | 5/1995 |
| DE | 102004060706 A1 | 7/2005 |
| DE | 202006020242 U1 | 1/2008 |
| DE | 4245047 B4 | 9/2010 |
| FR | 2864053 A1 | 6/2005 |

* cited by examiner

*Primary Examiner* — Terrell Matthews
(74) *Attorney, Agent, or Firm* — Laurence A. Greenberg; Werner H. Stemer; Ralph E. Locher

(57) ABSTRACT

A device for loading a transporting unit provided for transporting piece goods, in particular mail deliveries, includes a first conveying unit which can be moved into the transporting unit and is provided for conveying and unloading a first stream of piece goods in the transporting unit. At least one second conveying unit is provided for conveying and unloading a second stream of piece goods in the transporting unit in order to optimize loading with respect to a transport filling density of the transporting unit, along with an increased loading throughput and increased working convenience. The piece goods are distributed among the streams of piece goods according to at least one sorting criterion.

13 Claims, 2 Drawing Sheets

DEVICE AND METHOD FOR LOADING A TRANSPORTING UNIT

BACKGROUND OF THE INVENTION

Field of the Invention

The invention is based on a device for loading a transporting unit intended for transporting piece goods, in particular mail deliveries, having a first conveying unit which can be moved into the transporting unit and is intended for conveying and unloading a first stream of piece goods in the transporting unit.

On account of the requisite transport filling density the transportation of piece goods, in particular mail items, is today based predominantly on containers/swap bodies loaded in bulk and manually, and the transportation thereof by road. While the sortation in the sorting centers is today largely optimized and offers very high performance, the manual loading of the swap bodies/containers at the entrance gates represents a constant bottleneck and results in the logistics companies needing significantly more loading gates, staff and the space requirement associated therewith in order to achieve a necessary increase in the throughput of the sorting center. This involves considerable structural changes, in particular a new build.

The manual loading of extremely inhomogeneous mail items into the swap body/container takes place today with a throughput of less than 1000 parcels per hour and is extremely marginal from an ergonomic point of view.

Many different types of devices are hitherto known, such as in particular in the form of telescopic conveyors which can be moved into the transporting unit, which support the operator when loading said transporting unit. In addition, auxiliary equipment is made available by telescopic conveyor manufacturers which can be fitted to the existing telescopic conveyors. Such equipment primarily includes lifting platforms. Although said lifting platforms enable better adaptation to the loading height, they do not however relieve the operator of the lifting effort required.

BRIEF SUMMARY OF THE INVENTION

The object of the invention is to make available a generic device by means of which loading which is optimized with respect to the transport filling density of the transporting unit can be achieved with increased loading throughput and improved working convenience.

To this end it is proposed that the device has at least one second conveying unit which is intended for conveying and unloading a second stream of piece goods in the transporting unit, in which case the piece goods are distributed onto the streams of piece goods according to at least one sorting criterion. By this means it is possible to achieve optimum utilization of the available usable space of the transporting unit in an at least partially automated manner on the basis of the sorting criterion. As a result of distributing the piece goods onto at least two streams of piece goods it is possible in particular to achieve an optimized spatial distribution of the piece goods in the usable space according to the sorting criterion.

The invention is suitable in particular for use with a transporting unit which can be attached as a trailer to a motor vehicle and is designed in particular as a swap body or shipping container. When a loading operation is carried out by means of the device the transporting unit is expediently docked to a building from which the conveying units are extended and moved into the usable space of the transporting unit. Said building preferably serves the purpose of a sorting center in which the piece goods to be loaded are sorted prior to the loading operation.

The conveying units can be designed in particular in each case as telescopable units. They can furthermore be moved independently of one another into the usable space of the transporting unit.

It is however advantageous if the first conveying unit and the second conveying unit can be moved jointly into the transporting unit. The conveying units could in this case be driven separately from one another, but in an advantageous embodiment it is proposed that the conveying units are coupled together mechanically for the purpose of joint inward movement.

In order to ensure that the at least two streams of piece goods are made available in a particularly quick and simple manner it is proposed that the device comprises a sorting unit which is connected to the conveying units using conveyor technology and sorts a primary stream of piece goods in order to generate the first and the second streams of piece goods according to the sorting criterion. This means that the conveying units can be fed with piece goods presorted according to the sorting criterion without human intervention to the greatest possible extent. Said sorting unit is preferably arranged in the region of a delivery point of a sorting center which is assigned to a gate of the sorting center at which the transporting unit to be loaded is docked.

By preference the sorting criterion is related to at least one physical attribute of the piece goods, which is an extent, the weight, the volume, a surface, the shape and/or a combination of a plurality of said features. As a result of taking into consideration one of said features or a combination of a plurality of said features it is possible to achieve a sortation of the piece goods which is directed at an optimum filling level of the usable space of the transporting unit.

Expediently, the sorting unit is operatively connected with a capture unit which is intended for capturing the physical attribute. This can be designed for example as a read and/or weighing device. A separating device which separates the piece goods from one another according to the sorting criterion depending on the physical attribute captured or ascertained is preferably connected downstream of the capture unit.

In particular, the sorting criterion is used in order to differentiate between "conveyor-dischargeable" and "conveyor-nondischargeable" piece goods on the basis of the physical attribute. Piece goods which can be regarded as conveyor-dischargeable are conventionally handled differently by an operator from the other piece goods which per se are larger and/or heavier. As a result of a sortation according to this criterion a distribution onto the conveying units can take place, in which case the conveying units are adapted in each case to the characteristics of the different, conveyor-dischargeable or conveyor-nondischargeable piece goods. A different handling technique, a different unloading technique in particular, can thus be employed in each case for the conveying units, which means that the best possible handling throughput can be achieved for the respective type of piece goods.

In order to check whether an individual piece good satisfies the sorting criterion "conveyor-dischargeable", in particular an edge length, a weight parameter and/or a variable based on said features can be taken into consideration as a physical attribute. The physical attribute is expediently compared with a preset threshold value, in which case undershooting or exceeding said threshold value results in an assignment to the corresponding sort category. For example, a value between 300 mm and 400 mm can be set as the threshold value for a maximum edge length.

Particularly advantageous utilization of the usable space of the transporting unit and a high level of working convenience for the operator when carrying out loading in the uppermost region of the usable space can moreover be achieved if the streams of piece goods are conveyed onto at least two conveyor tracks at different heights by means of the conveying units. A height in this case is preferably defined relative to the floor of the transporting unit.

In this context it is proposed that the uppermost conveyor track is intended for conveying conveyor-dischargeable piece goods. Conveyor discharging of said piece goods can thus take place particularly advantageously across a stack of further, larger and heavier piece goods which have been unloaded by means of a lower conveyor track in the usable space. This means that the unloading of the conveyor-dischargeable piece goods by means of the uppermost conveyor track can take place in orderless fashion and with a high throughput and the operator is not required to do as much lifting.

In an advantageous development of the invention it is proposed that the device has a chute which is arranged at the unloading end of the lowermost conveyor track. It is thereby possible to achieve a rapid unloading offering working convenience which takes place predominantly by means of a sliding motion of the piece goods. If the lowermost conveyor track is intended for conveying piece goods which are regarded as "conveyor-nondischargeable" according to the sorting criterion, a placement to a location determined by the operator in order to form a stack can take place in a simple manner. In order to increase the accessibility of decentralized marginal regions of the usable space of the transporting unit the chute can be designed as a swiveling unit.

The working convenience for the operator can be further increased in that the device has a lifting device which is intended for adjusting the height at least of the lowermost conveyor track. This preferably enables an adjustment at least of the unloading end of the lowermost conveyor track to the growing height of an accumulation, in particular of a stack of piece goods. By means of the lifting device the unloading end can be positioned at a height which is ergonomic for the operator in regard to the height of accumulation. Unloading of the piece goods without lifting effort on the part of the operator can be achieved particularly advantageously regardless of said height of accumulation.

In this context it is proposed that the device has a working platform intended for the operator which is adjustable in height. By this means the manual handing range of the operator situated on the working platform can be significantly extended. In particular, the loading space situated overhead today in the transporting unit can be utilized. The working platform is preferably coupled at the unloading end of the lowermost conveying unit. The lifting device for adjusting the height of the lowermost conveyor track or a lifting unit independent thereof can be employed for lifting the working platform.

It is furthermore proposed that the device comprises a conveyor belt which is arranged at the unloading end of the uppermost conveyor track and has a selectable conveying direction. A high degree of maneuverability of the uppermost conveyor track can be attained, which means that a large unloading space and thus a high filling level of the usable space of the transporting unit can be achieved. The conveying direction can if required be selected manually by the operator.

In particular, the conveyor belt can be designed as a telescopable and/or swiveling conveyor belt.

If the uppermost conveyor track is intended for conveying piece goods which are considered to be conveyor-dischargeable, the piece goods can be deposited with a high throughput rate across a stack formed with the conveyor-nondischargeable piece goods.

A further optimization of the filling level of the transporting unit can additionally be achieved if, with regard to the usable height of the transporting unit, the uppermost conveyor track is used for depositing piece goods in the uppermost third of the usable height. The "usable height" should in particular be understood as the vertical extent of the usable space of the transporting unit.

In addition, a method for loading a transporting unit intended for transporting piece goods, in particular mail items, is proposed, wherein piece goods are distributed onto at least a first and a second conveying unit according to a sorting criterion, the conveying units are moved into the transporting unit, piece goods are unloaded in the transporting unit by means of the first conveying unit and piece goods are unloaded in the transporting unit by means of the second conveying unit. This means that an optimum utilization of the available usable space of the transporting unit can be achieved in an at least partially automated fashion on the basis of the sorting criterion. As a result of distributing the piece goods onto at least two streams of piece goods it is possible according to sorting criterion in particular to achieve an optimized spatial distribution of the piece goods in the usable space.

In this case the conveying units preferably form at least two conveyor tracks which have a different height, which means that a particularly advantageous utilization of the usable space of the transporting unit and a high level of working convenience for the operator can be attained when loading in the uppermost region of the usable space.

It is furthermore proposed that the sorting criterion is used in order to differentiate between "conveyor-dischargeable" and "conveyor-nondischargeable" piece goods on the basis of a physical attribute of the piece goods, with piece goods which are regarded as conveyor-nondischargeable being stacked by means of the lowermost conveyor track in the transporting unit and piece goods which are regarded as conveyor-dischargeable being unloaded by means of the uppermost conveyor track onto the formed stack of conveyor-nondischargeable piece goods. This means that a loading operation tailored to the attributes of the piece goods with a high throughput can be attained.

BRIEF DESCRIPTION OF THE SEVERAL VIEWS OF THE DRAWING

An exemplary embodiment will be described with reference to the drawings. In the drawings.

DESCRIPTION OF THE INVENTION

Figure 1:
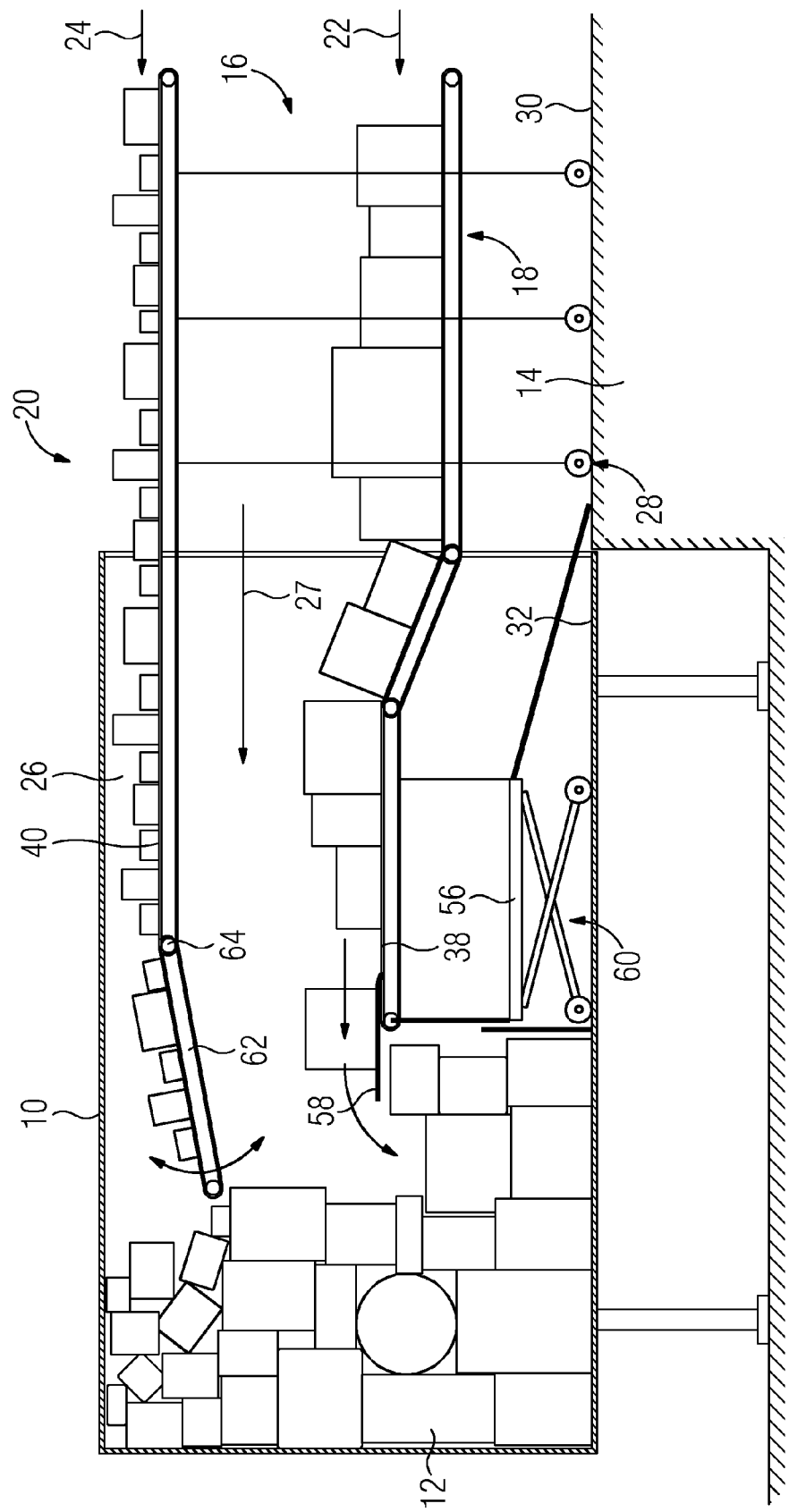
FIG. 1: shows a schematic illustration of a transporting unit docked at a sorting center, into which a loading device has been moved

FIG. 1 shows a schematic sectional view of the arrangement of a transporting unit 10 designed as a truck trailer or swap body for transporting piece goods 12 taking the form of mail items, in particular postal packages, in a position docked at a sorting center 14. For loading the transporting unit 10 with piece goods 12 a device 16 is provided which has two different conveying units 18, 20, each of which is used for conveying and unloading a stream of piece goods 22 and 24 respectively in the transporting unit 10.

The conveying units 18, 20 can be moved together into the usable space 26 of the transporting unit 10 in a direction of movement 27 which corresponds in particular to the longitudinal direction of the transporting unit 10. In the exemplary embodiment under consideration they are coupled mechanically to one another as a contiguous unit which has running gear 28 capable of rolling on the floor 30 of the sorting and distribution center 14 or on the floor 32 of the transporting unit 10.

Figure 2:
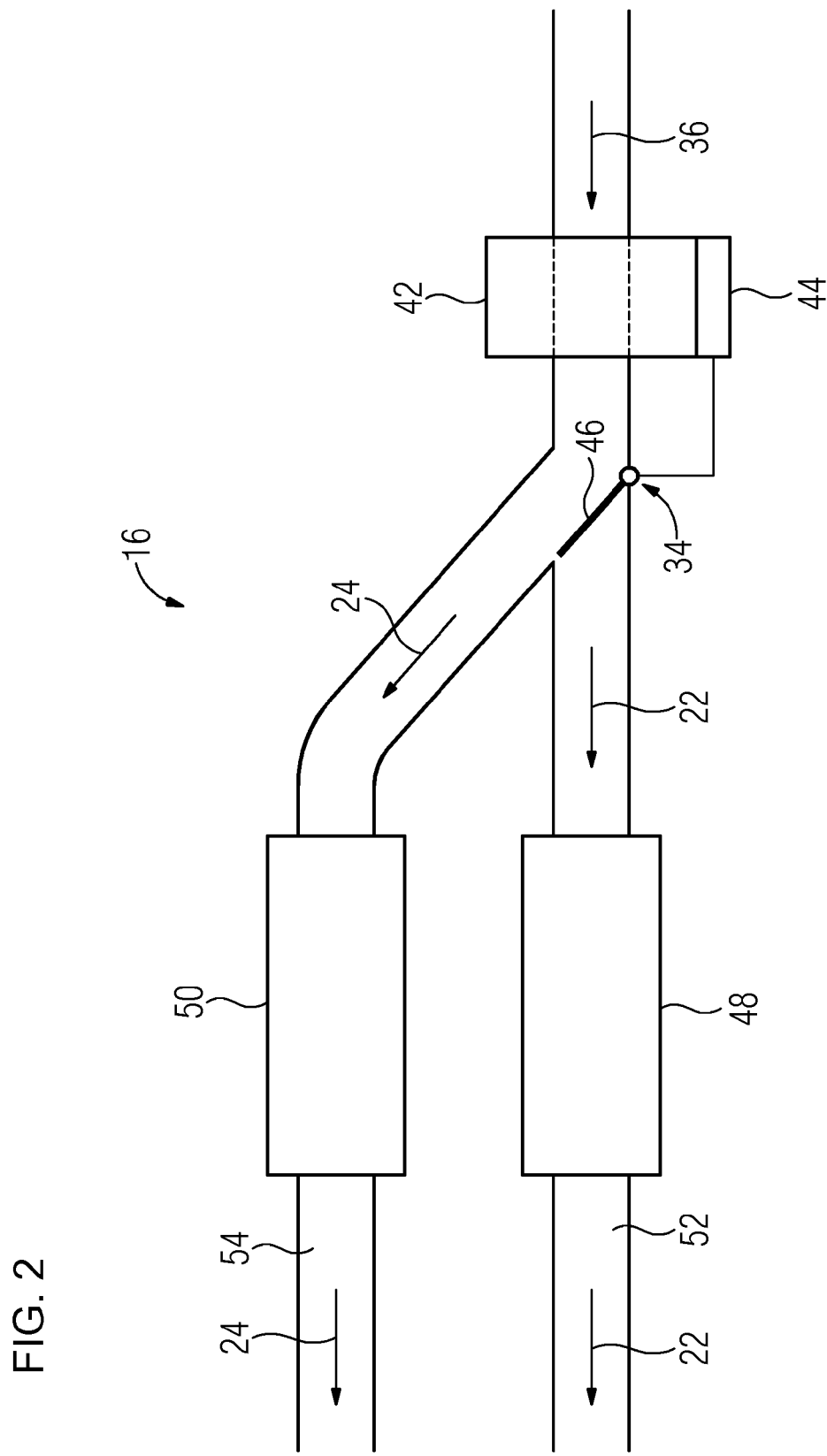
FIG. 2: shows a schematic illustration of a sorting unit from above, which is located upstream of the loading device and connected therewith using conveyor technology.

Connected using conveyor technology to the conveying units 18, 20 is a sorting unit 34 shown in FIG. 2 which serves to sort a primary stream of piece goods 36 in order to generate the first and second streams of piece goods 22, 24 according to a sorting criterion, as explained in detail further below. The sorting unit 34 is arranged in the region of the delivery point of the sorting center 14 which is assigned to the building gate at which the transporting unit 10 is docked. The primary stream of piece goods 36 is generated for example by means of a sorting system (not illustrated in more detail) of the sorting center 14 which sorts the piece goods 12 for example according to their addressees.

The conveying units 18, 20 each have a respective conveyor track 38, 40 which are at different heights relative to the floor 30 or 32 respectively. In the exemplary embodiment under consideration the conveyor tracks 38, 40 are formed in each case by a set of conveyor belts which immediately adjacent to one another. In the embodiment shown, the conveyor track 38 corresponds to the lowermost conveyor track, while the conveyor track 40 corresponds to the uppermost conveyor track. The conveyor tracks 38, 40 can have a variable height in their course along the streams of piece goods 22, 24 by having—as illustrated—up and down gradients.

The loading operation for the transporting unit 10 takes place as described in the following.

Firstly, automatic recognition takes place of the piece goods 12 of the primary stream of piece goods 36. This serves to recognize whether an individual piece good 12 to be sorted satisfies a particular sorting criterion. In particular, features of the piece goods 12 such as a shape, an extent, a surface, the volume and/or the weight can be captured and used as the basis for a sortation according to the sorting criterion. In the exemplary embodiment under consideration the sorting criterion relates to an extent, which in particular is an edge length, and alternatively or additionally to the weight of the piece goods 12. This is done by means of a capture device 42 which is intended for capturing the corresponding feature or features of the piece goods 12. The capture device 42 is in particular designed as a read and/or weighing device. On the basis of one or more parameters captured by the capture device 42 an evaluation is carried out by an evaluation unit 44 of the sorting unit 34, wherein it is determined whether or not the individual piece good 12 satisfies a predetermined sorting criterion. With reference to the parameters captured, the evaluation unit 44 is able to determine whether the individual piece good 12 examined exhibits the attribute "conveyor-dischargeable" or "conveyor-nondischargeable".

Depending on said determination by the evaluation unit 44, the individual piece good 12 is moved on by means of a separating device 46, which is implemented in the example under consideration as a gate, either into the stream of piece goods 22 if the individual piece good 12 can be regarded as "conveyor-nondischargeable", or into the stream of piece goods 24 if the individual piece good 12 can be regarded as "conveyor-dischargeable". The separating device 46 in cooperation with the capture device 42 and the evaluation unit 44 guides—according to the sorting criterion—the piece goods 12 into the first or into the second stream of piece goods 22 or 24 respectively, with the streams of piece goods 22, 24 each being assigned to a different conveyor track 38 or 40 of the respective conveying units 18, 20.

After the separation of the primary stream of piece goods 36 by means of sorting unit 34, the piece goods 12 are stored in storage units 48, 50 which are each arranged in one of the streams of piece goods 22, 24. The storage units 48, 50 are illustrated schematically and can for example be designed as a spiral chute or spiral conveyor.

After being stored, the piece goods 12 from the respective streams of piece goods 22, 24 are conveyed automatically onto two separate conveyor sections 52, 54 to the respective conveying unit 18, 20. Here the conveyor tracks 38, 40 are filled with piece goods 12.

The conveying units 18, 20 are subsequently moved together into the usable space 26 of the docked transporting unit 10. The device 16 furthermore has a working platform 56 on which an operator can stand and which is moved together with the conveying units 18, 20 into the usable space 26. The inward movement is controlled by the operator and is powered.

First to be handled are the piece goods 12 from the first stream of piece goods 22 which are regarded as "conveyor-nondischargeable" and are arranged on the lowermost conveyor track 38.

Said piece goods 12 are unloaded onto the floor 32 of the transporting unit 10 and stacked upon one another. In this case the piece goods 12 are simply shifted by the operator from their position at the end of the lowermost conveyor track 38 onto the floor 32 or into a stack position. The arduous task of lifting the piece goods 12 can hereby be avoided. The lowermost conveying unit 18 furthermore has a telescopable chute 58 which supports the shifting of the piece goods 12 into the stack position by the operator.

The device 16 furthermore has a preferably powered lifting device 60 which is intended for adjusting the height of the lowermost conveyor track 38 such that the working height can be continuously adjusted to the growing height of the stack. The height of the working platform for the operator can be altered by means of the lifting device 60 or a lifting device which can be driven independently of the lifting device 60.

The stacking described hereinabove of the piece goods 12 which are conveyed into the usable space 26 in the stream of piece goods 22 by means of the lowermost conveyor track 38 and are regarded as "conveyor-nondischargeable" takes place up to a height relative to the floor 32 which corresponds to approx. two thirds of the height, in other words of the vertical extent, of the usable space 26.

The remainder of the loading height, in other words in particular the uppermost third of the height of usable space 26, is filled up by an orderless loading operation of the piece goods 12 conveyed in the stream of piece goods 24 by means of the uppermost conveyor track 40 into the usable space 26. Said piece goods 12, which are regarded as "conveyor-dischargeable" goods, are in this case discharged on the stacks until a desired filling level has been reached. In order to achieve a high freedom of movement the uppermost conveyor track 40 is formed at its unloading end by a conveyor belt 62 which is telescopable and can swivel around a horizontal axis 64.

The conveying units 18, 20 are subsequently withdrawn in the opposite direction from that indicated 27 in order to provide the operator again with an ergonomic working distance and to perform the layer-wise construction of the stack described above.

The invention claimed is:

1. A device for loading a transporting unit for transporting piece goods including mail deliveries, the device comprising:
   a first conveying unit configured to be moved into the transporting unit and to convey and unload a first stream of piece goods in the transporting unit; and
   at least one second conveying unit configured to convey and unload a second stream of piece goods in the transporting unit;
   said streams of piece goods configured to receive distributions of the piece goods according to at least one sorting criterion, said sorting criterion being related to at least one physical attribute of the piece goods selected from the group consisting of an extent, a weight, a volume, a surface, a shape and a combination of a plurality of said physical attributes, said sorting criterion being used to differentiate between conveyor-dischargeable and conveyor-non-dischargeable piece goods based on said physical attributes;
   said conveying units each having a respective conveyor track disposed at different heights, said conveying units configured to convey said streams of piece goods with said at least two conveyor tracks.

2. The device according to claim 1, wherein said first conveying unit and said second conveying unit are configured to be moved jointly into the transporting unit.

3. The device according to claim 1, which further comprises a sorting unit connected to said conveying units using conveyor technology, said sorting unit configured to sort a primary stream of piece goods to generate said first and second streams of piece goods according to said sorting criterion.

4. The device according to claim 1, wherein said at least two conveyor tracks include an uppermost conveyor track configured to convey the conveyor-dischargeable piece goods.

5. The device according to claim 4, wherein said at least two conveyor tracks include a lowermost conveyor track having an unloading end and a chute disposed at said unloading end.

6. The device according to claim 5, which further comprises a lifting device configured to adjust a height of at least said lowermost conveyor track.

7. The device according to claim 6, which further comprises a working platform for an operator, said working platform being adjustable in height.

8. The device according to claim 4, wherein said uppermost conveyor track has an unloading end and a conveyor belt at said unloading end having a selectable conveying direction.

9. The device according to claim 4, wherein said uppermost conveyor track is configured to deposit piece goods in an uppermost third of a usable height of the transporting unit.

10. A method for loading a transporting unit for transporting piece goods including mail deliveries, the method comprising the following steps:
    distributing piece goods onto at least first and second conveying units according to a sorting criterion, the conveying units each having a respective conveyor track with different heights relative to one another;
    relating the sorting criterion to at least one physical attribute of the piece goods selected from the group consisting of an extent, a weight, a volume, a surface, a shape and a combination of a plurality of said physical attributes;
    using the sorting criterion for determining conveyor-dischargeable and conveyor-non-dischargeable piece goods based on the physical attributes;
    directing each of the piece goods to a corresponding one of the conveyor tracks based upon being conveyor-dischargeable or conveyor-non-dischargeable;
    moving the conveying units into the transporting unit;
    unloading piece goods in the transporting unit by using the first conveying unit; and
    unloading piece goods in the transporting unit by using the second conveying unit.

11. The method according to claim 10, which further comprises:
    providing the at least two conveyor tracks as a lowermost conveyor track and an uppermost conveyor track;
    differentiating between conveyor-dischargeable and conveyor-non-dischargeable piece goods based on a physical attribute of the piece goods using the sorting criterion;
    stacking piece goods regarded as conveyor-non-dischargeable by using the lowermost conveyor track in the transporting unit; and
    unloading piece goods regarded as conveyor-dischargeable onto the formed stack of conveyor-non-dischargeable piece goods by using the uppermost conveyor track.

12. The device according to claim 1, wherein said conveyor tracks are each configured different for different off-loading techniques.

13. A device for loading a transporting unit for transporting piece goods including mail deliveries, the device comprising:
    a first conveying unit having a first conveyor track configured to be moved into the transporting unit and to convey and unload a first stream of piece goods in the transporting unit; and
    at least one second conveying unit having a second conveying track configured to convey and unload a second stream of piece goods in the transporting unit, said second conveyor track being disposed above said first conveyor track;
    said first and second conveyor tracks for receiving distributions of the piece goods according to at least one sorting criterion, the sorting criterion being used to differentiate between conveyor-dischargeable and conveyor-non-dischargeable piece goods based on physical attributes of the piece goods;
    said first conveyor track configured for receiving the conveyor non-dischargeable piece goods and said second conveyor track configured for receiving the conveyor dischargeable piece goods.

* * * * *